(12) United States Patent
Bucher et al.

(10) Patent No.: US 8,669,304 B2
(45) Date of Patent: Mar. 11, 2014

(54) DRAG REDUCING COMPOSITIONS AND METHODS OF MANUFACTURE AND USE

(75) Inventors: Brad A. Bucher, Houston, TX (US); Michael Cox, Georgetown, TX (US); Tom M. Weatherford, Magnolia, TX (US)

(73) Assignee: Flowchem, Ltd., Waller, TX (US)

( * ) Notice: Subject to any disclaimer, the term of this patent is extended or adjusted under 35 U.S.C. 154(b) by 299 days.

(21) Appl. No.: 12/996,055

(22) PCT Filed: Jun. 9, 2009

(86) PCT No.: PCT/US2009/003465
§ 371 (c)(1),
(2), (4) Date: Jan. 11, 2011

(87) PCT Pub. No.: WO2009/151576
PCT Pub. Date: Dec. 17, 2009

(65) Prior Publication Data
US 2011/0132466 A1    Jun. 9, 2011

Related U.S. Application Data

(60) Provisional application No. 61/059,876, filed on Jun. 9, 2008, provisional application No. 61/166,269, filed on Apr. 3, 2009.

(51) Int. Cl.
*C09K 3/00* (2006.01)

(52) U.S. Cl.
USPC ........... 523/175; 524/570; 524/579; 524/582; 524/583; 524/585

(58) Field of Classification Search
USPC ........... 523/175; 524/570, 579, 582, 583, 585
See application file for complete search history.

(56) References Cited

U.S. PATENT DOCUMENTS

| | | | | |
|---|---|---|---|---|
| 3,739,848 A | * | 6/1973 | Lawson et al. | 166/270.1 |
| 4,289,679 A | * | 9/1981 | Mack | 585/523 |
| 4,358,572 A | * | 11/1982 | Mack et al. | 585/524 |
| 4,415,704 A | * | 11/1983 | Weinstein | 525/76 |
| 4,433,123 A | * | 2/1984 | Mack | 526/139 |
| 4,493,903 A | * | 1/1985 | Mack | 502/121 |
| 4,493,904 A | * | 1/1985 | Mack | 502/122 |
| 4,789,383 A | * | 12/1988 | O'Mara et al. | 44/459 |
| 4,826,728 A | * | 5/1989 | O'Mara et al. | 428/407 |
| 4,837,249 A | * | 6/1989 | O'Mara et al. | 523/175 |
| 5,539,044 A | * | 7/1996 | Dindi et al. | 524/570 |
| 6,894,088 B2 | * | 5/2005 | Motier et al. | 523/175 |
| 6,946,500 B2 | * | 9/2005 | Harris et al. | 523/175 |
| 7,271,205 B2 | * | 9/2007 | Mathew et al. | 523/175 |
| 2002/0045010 A1 | * | 4/2002 | Rohrbaugh et al. | 427/372.2 |
| 2007/0240762 A1 | * | 10/2007 | Harris et al. | 137/13 |

FOREIGN PATENT DOCUMENTS

| | | |
|---|---|---|
| WO | WO 97/32926 | 9/1997 |
| WO | WO9816586 | * 4/1998 |
| WO | WO 01/83650 | 11/2001 |
| WO | WO 2006/081010 | 8/2006 |
| WO | WO 2008/014190 | 1/2008 |
| WO | WO 2008/073293 | 6/2008 |

* cited by examiner

*Primary Examiner* — Edward Cain
(74) *Attorney, Agent, or Firm* — Bushman & Associates, P.C.

(57) ABSTRACT

A drag reducing composition comprising a primary polyolefin obtained by polymerizing mono-olefins containing from about 2 to about 30 carbon atoms, and a surfactant having an HLB in the range of 6.5 to 8.5 in an aqueous suspending media.

22 Claims, No Drawings

DRAG REDUCING COMPOSITIONS AND METHODS OF MANUFACTURE AND USE

CROSS-REFERENCE TO RELATED APPLICATION

This application claims the priority of U.S. Provisional Application No. 61/059,876 filed on Jun. 9, 2008, and U.S. Provisional Application No. 61/166,269 filed on Apr. 3, 2009, the disclosures of which are incorporated herein by reference for all purposes.

FIELD OF THE INVENTION

The present invention relates to compositions for reducing friction in the flow of hydrocarbons such as crude oil or refined products in conduits such as pipelines, and to methods for producing and using such compositions.

DESCRIPTION OF THE PRIOR ART

The prior art abounds with patents directed to generally non-crystalline, high molecular weight polyolefin, particularly polyalphaolefins, compositions which are generally hydrocarbon soluble and, when dissolved in a hydrocarbon fluid flowing through a conduit, greatly reduce turbulent flow and decrease "drag." This reduction of drag is important since it reduces the amount of horsepower needed to move a given volume of hydrocarbon, or conversely enables greater volumes of fluid to be moved with a given amount of power. These polyolefin drag reducers display flow enhancing characteristics not present in commonly known crystalline, largely non-hydrocarbon soluble polymers such as polyethylene and polypropylene.

It is known that these polyalphaolefin drag reducers are susceptible to degradation by shear when dissolved in the flowing hydrocarbon in the conduit. Accordingly, pumps, constrictions in the conduit or the like which result in excessive turbulent flow lead to degradation of the polymer thereby decreasing its effectiveness. Accordingly, it is necessary that the drag reducing compositions be introduced into the flowing hydrocarbon stream in a form which achieves certain desirable features.

First of all, the drag reducing compositions should be in a form that is easy to transport and handle without special equipment since injection points for the drag reducing compositions into the flowing hydrocarbon stream are often at remote and inaccessible locations. Secondly, the polymer must be in a form which dissolves rapidly in the hydrocarbon stream flowing in the conduit since the polyalphaolefins have little drag reducing effect until solubilized in the hydrocarbon stream. Lastly, the drag reducing composition should impart no deleterious effects to the hydrocarbon. For example, in the case of crude oil flowing through a pipeline, certain amounts of material and contaminants can be tolerated unlike in finished pipeline products such as diesel fuel, gasoline and other hydrocarbon materials resulting from refining operations.

U.S. Pat. No. 5,539,044 discloses a drag reducing composition comprising an ultra high molecular weight, hydrocarbon soluble, polyalkylene having 2/30 carbon atoms per alkylene precursor, water and a surfactant having an HLB of at least about 9, and that exemplary formulations are obtained with nonylphenol and tridecyl alcohol ethoxylate surfactants having HLBs in the 10.4 to 16.7 range. While the compositions of U.S. Pat. No. 5,539,044 permit relatively high loading of a polyalkylene drag reducing agent, it is sometimes necessary to include an anti-foam agent and/or a low foaming surfactant to control foaming. In this regard it will be understood that drag reducing compositions often times are maintained in relatively large vessels and with time are subject to settling regardless of how stable the dispersions may be initially. Thus, when it is time to inject the drag reducing compositions into a flowing hydrocarbon stream, in order to ensure uniformity of the drag reducing composition, some form of agitation, e.g. sparging, mixing, etc. is necessary to "homogenize" the formulation. This agitation can lead to foaming causing problems in the introduction of the drag reducing composition into the flowing hydrocarbon and other handling problems.

SUMMARY OF THE INVENTION

In one aspect the present invention provides drag reducing compositions which permit a high loading of active polyolefin in the composition, eliminate agglomeration and heat stability problems, and are low-foaming. The compositions can utilize surfactants with an HLB in the range of 6.5 to 8.5

In another aspect, the present invention provides a drag reducing composition containing polyolefin, a carrier or suspending medium comprising water and a bridging system selected from the group consisting of highly branched surfactants having an HLB of from about 6.5 to about 8.5, a mixture of a polymeric coupling agent and a surfactant, linear or branched, having an HLB from about 6.5 to about 8.5, and mixtures thereof.

In still another aspect of the present invention, there is provided a method of reducing drag in a conduit conveying a liquid hydrocarbon comprising introducing into the conduit an effective amount of a drag reducing composition described above.

DESCRIPTION OF THE PREFERRED EMBODIMENTS

Polymers which are used to prepare the finely divided polymer particles used in the drag reducing compositions of the present invention are obtained by polymerizing or copolymerizing mono-olefins containing from about 2 to about 30 carbon atoms. More usually, the mono-olefins, which are preferably alpha olefins, used in the preparation of the friction-reducing polymers used in the drag reducing compositions of the present invention contain from about 4 to about 20 carbon atoms, most preferably from about 6 to about 14 carbon atoms.

Any of several well known methods for polymerizing the mono-olefins may be employed to produce the polymeric/co-polymeric friction-reducing agents used in the drag reducing compositions of the present invention. A particularly suitable method is the Ziegler-Natte process which employs a catalyst system comprising the combination of a compound of a metal of Groups IVb, Vb, VIb, or VIII of the Periodic Chart of Elements, with an organo metal compound of a rare earth metal or a metal from Groups Ia, IIa, and IIIb of the Periodic Chart of the Elements. Particularly suitable catalyst systems are those comprising titanium halides and organo aluminum compounds. A typical polymerization procedure is to contact the monomeric mixture with a catalyst in a suitable inert hydrocarbon solvent for the monomers and the catalyst in a closed reaction vessel at reduced temperatures autogenous pressure and in a nitrogen or inert atmosphere. Methods and catalysts used in the preparation of polyolefin drag-reducing polymers useful in the present invention are disclosed in the following U.S. Pat. Nos. 4,289,679; 4,358,572; 4,415,704; 4,433,123; 4,493,903; and 4,493,904, all of which are incorporated herein by reference for all purposes. Polyalphaolefins used in the drag reducing compositions of the present invention can be produced by a so-called solution polymerization technique, or by bulk polymerization methods as described, for example, in U.S. Pat. No. 5,539,044, the disclosure of which is incorporated herein by reference for all purposes.

The polymers which are used in preparing the drag reducing compositions of the present invention are generally those of high molecular weight, the only limitation on the molecular weight being that it must be sufficient to provide effective friction reduction in the flowing stream of hydrocarbon in a conduit. In general, the effectiveness of the polymer composition to reduce friction increases as the molecular weight increases. On the upper end of the scale, the molecular weight of the polymers used in the process of the invention is limited only by the practicability of making the polymers. The average molecular weight of the desirable polymers is usually over 100,000 and is generally in the range of from about 100,000 to about 30 million. The average molecular weight of the polymers used in the processes and compositions of the present invention is preferably in the range of about 10 to about 25 million. In general, useful polyolefins in the present invention can be characterized as ultra-high molecular weight non-crystalline polymers.

Generally speaking, the drag reducing compositions of the present invention will contain from about 10 to 45%, preferably 30 to 41% by weight of the polyolefin produced as described above, be it a solution or bulk polymerized polymer. Unless otherwise specified, all percentages herein are by weight and refer to the weight of the drag reducing compositions.

In addition to the polyolefin friction reducing agent, the drag reducing compositions of the present invention can contain a coating or partitioning agent, e.g., a wax. The term "wax" includes any low melting, e.g., <500° C., organic mixture or compound of high molecular weight which is solid at ambient temperature. The waxes contemplated by the present invention can be natural, i.e., derived from animal, vegetable or mineral sources, e.g., fatty acid waxes, or synthetic as, for example, ethylenic polymers, waxes obtained from the Fischer-Tropsch synthesis, etc. Non-limiting examples of suitable waxes include paraffin, micro-crystalline wax, slack or scale wax, polymethylene wax, polyethylene wax, fatty acid wax, etc. Typically, the waxes used in the compositions of the present invention are hydrocarbon in nature and are powders or particulates at room temperature. In addition to waxes, non-limiting examples of other suitable coating agents include talc, alumina, metal salts of a fatty acid, e.g., metal stearates, silica gel, polyanhydride polymers, etc. It will be understood that the term "coating agent" is intended to and does include components which while not actually coating the polymeric friction reducing agent, interact with the polymeric reducing agents in such a way, be it chemical or physical, which prevents the polyolefin, when ground to a desired particle size, from agglomerating to the extent that the agglomerated material constitutes a solid or substantially solid non-dispersable mass.

Generally speaking and when used, the coating or partitioning agent will be present in the compositions of the present invention in an amount of from about 0.1 to about 25% by weight, preferably from about 5 to about 10% by weight.

In addition to the polyolefin and coating or partitioning agent, certain of the compositions of the present invention can contain a solvent-polyolefin bridging system comprised of a highly branched surfactant or such surfactant blend having an average HLB between about 6.5 and 8.5, or a surfactant plus polymeric coupling agent, wherein the surfactant is linear or branched, and has an HLB between about 6.5 and 8.5.

The term "highly branched surfactant" as used herein means a surfactant within the specified HLB range and having a hydrophobic portion and a hydrophylic portion (HL) having the general formula:

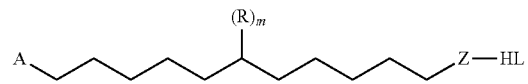

wherein

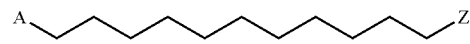

is the hydrophobic portion and represents a hydrocarbon parent chain having from 6 to 40 carbon atoms;

wherein m represents the number of R groups and is from 2 to 20;

wherein each of the R groups is attached to a carbon atom in the hydrocarbon parent chain;

wherein each of the R groups is independently a $C_1$-$C_{18}$ alkyl group with the proviso that at least two of the R groups attached to the hydrocarbon parent chain are branched alkyl groups containing from 3 to 18 carbon atoms;

wherein HL represents the hydrophilic portion with the proviso that HL can be attached to any carbon atom in the hydrophobic portion; and wherein the hydrocarbon parent chain and any one or more of the R groups can be connected in such a way as to form one or more cyclic groups.

Preferably the hydrophilic portion (HL) is an alkoxylate grouping, especially an ethoxylate grouping having at least two (2) ethoxy groups, i.e. $(CH_2—CH_4—O)_2—H$.

Non-limiting examples of specific, highly branched surfactants having the above general formula and the specified HLB range include:

a 2-pentyl 4-butyl hexanol alkoxylate having the formula:

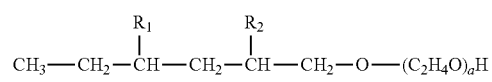

wherein $R_1$ is a branched $C_4$ alkyl group, $R_2$ is a branched $C_5$ alkyl group, and a is the number of ethylene oxide groups necessary to achieve the desired HLB;

a dinonylphenol alkoxylate having the formula:

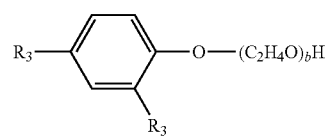

wherein each $R_3$ is independently a branched $C_6$-$C_{18}$ alkyl group and b is the average number of ethoxy groups required to achieve an overall HLB of from 6.5 to 8.5;

and a triglyceride alkoxylate having the formula:

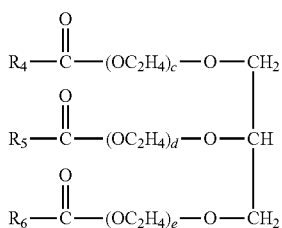

wherein $R_4$, $R_5$ and $R_6$ are independently $C_6$-$C_{18}$ alkyl groups and c, d and e are equal to the average degree of ethoxylation required to reach an overall HLB in the desired range.

Non-limiting examples of specific linear and branched surfactants having the specified HLB range include:

a linear alcohol ethoxylate having the formula:

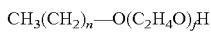

wherein n is 5 to 27 and f is the average number of ethoxy groups required to achieve an overall HLB of from 6.5 to 8.5, as for example wherein n is 21, and f is 4, a secondary alcohol ethoxylate having the formula:

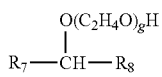

wherein each $R_7$ and $R_8$ are independently alkyl groups having from 0 to 23 carbon atoms and g is the average number of ethoxy groups required to achieve an overall HLB from 6.5 to 8.5, as for example wherein $R_7$ is 7, $R_8$ is 10, and g is 3.5, and a nonylphenol alkoxylate having the formula:

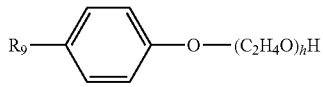

wherein $R_9$ is a branched $C_6$-$C_{18}$ alkyl group and h is the average number of ethoxy groups required to achieve an overall HLB in the range of 6.5 to 8.5, as for example wherein $R_9$ is 9 and h is 3.

The surfactant, highly branched, branched, and/or linear, or mixture thereof can comprise a wide variety of materials, and will generally be present in an amount of from about 0.1 to about 8% by weight of the composition, preferably in an amount of from about 1 to about 3% by weight, more preferably from about 0.5 to about 2% by weight.

As noted, the surfactants, whether highly branched, branched or linear, will have an average HLB of from about 6.5 to about 8.5, and more preferably from about 7.6 to about 8.4. The branched and/or linear surfactant, whether or not combined with a coupling agent can be a single surfactant or a blend of surfactants yielding the specified HLB range of 7.6 to 8.4.

Suitable non-limiting examples of surfactants, whether highly branched, branched, or linear falling within the specified HLB range include primary alcohol ethoxylates and alkylphenol ethoxylates having from about 32.5% to about 42.5%, by weight, of polyethylene oxide. Other suitable nonionic surfactants having the specified HLB range include specific ethylene oxide/propylene oxide block copolymers, alcohol and alkylphenol alkoxylates made with ethylene oxide and propylene oxide, or any combination thereof, secondary alcohol alkoxylates, dialkylphenol alkoxylates, fatty acid and fatty ester alkoxylates, di-ester alkoxylates, triglyceride alkoxylates, sorbitol derivatives (sorbitan esters and sorbitan ester alkoxylates), glycerol esters of fatty acids, alkanolamides, ethoxylated amines, amine oxides, polyamines, and alkoxylated polydimethyl siloxanes.

Preferred alkoxylate surfactants include ethoxylated dialkylphenols, such as di-octyphenol, di-nonylphenol, and di-dodecaphenol ethoxylates, linear and/or branched primary and secondary alcohol ethoxylates, ethoxylated alkyldiols and ethoxylated alkyltriols, including ethoxylated glycerol and glycerol derivatives. Also included are ethoxylated alkylphenols, such as octylphenol ethoxylates, nonylphenol ethoxylates, and dodecaphenol ethoxylates. Also included are ethoxylated triglycerides, fatty acids and fatty acid esters, such as methyl ester ethoxylates and various alkyl-alkyl esters and di-esters. Also included are ethoxylated alkoxylates, such as ethoxylated polypropylene oxide and ethoxylated polybutylene oxide, and conversely, propoxylated polyethyleneoxide and butoxylated polyethylene oxide. Also included are ethoxylated amines and amides. Also included are sorbitol derivatives (sorbitan ester ethoxylates) and ethoxylated polydimethyl siloxanes.

Suitable anionic surfactants having the desired HLB range may include dialkylbenzene sulfonates, diphenyl alkane sulfonates, long-chain alkylbenzene sulfonates, high molecular weight internal olefin sulfonates, high molecular weight alpha olefin sulfonates, naphthalene sulfonates, and mixtures thereof.

Suitable cationic surfactants having the desired HLB range may include specific quaternary ammonium salts Suitable amphoteric surfactants having the desired HLB range may include specific betaines (alkylbetaine, amidoalkylbetaine, imidazoliniumbetaine, etc.).

As noted above, the bridging system comprises (1) a highly branched surfactant or mixture thereof, as defined above, (2) a combination of a linear or branched surfactant with a polymeric coupling agent, or (3) a mixture thereof. While there are surfactants that are linear or branched that are within the specified HLB range and exhibit low foaming, they do not permit the formation of a stable suspension, containing greater than about 32% by weight of polymeric drag reducing material, unless they are combined with a polymeric coupling agent. The role of these coupling agents is to bring together aqueous and non-aqueous components. These agents, although polar in nature, are large polymeric molecules having negligible surface activity, so they do not behave as surface active agents, nor do they appreciably lower surface tension but work by physically (sterically) bridging aqueous and non-aqueous components.

Non-limiting coupling agents include polyelectrolytic water-soluble polymers, made from charged, highly polar monomers, which are known to be effective water thickeners (see U.S. Pat. No. 3,739,848). In these polymers, recurring units that contain similarly-charged hydrophilic ionic groups (usually anionic groups) result in the polymer being water soluble. Furthermore, the repeating ionic groups have a tendency to repel each other, causing the polymer to extend rather than condense (have a large hydrodynamic volume). The extension of the polymer can affect solution properties (e.g., act as a thickening agent, or improve the ability of other thickening agents). In addition, these materials have been found to also provide an extended substrate surface significantly useful in the solubilization of less-water soluble moieties, i.e., act as a coupling agent. It is believed that the polymeric coupling agent, when included, acts to physically stabilize the polyolefin particulate in the water and surfactant solution. While not wanting to be bound, it is believed that the coupling agent acts in the form of an in-situ protective colloid vis-a-vis the polyolefin. In effect, it eliminates or minimizes coagulation or agglomeration of the polyolefin particles such that the drag reducing composition retains long-term stability, i.e., the particles do not gel or agglomerate as opposed to merely settling out, albeit as discrete particles. As used herein, the term "long-term stability" is intended to mean that the polyolefin particles stay in the composition as discrete particles for extended periods of time, e.g. 7 days or more, and that even after more extended periods of time, even if some of the polyolefin particles settle out of the suspending agent, e.g. primarily water, only agitation is required to disperse or re-suspend the polyolefin particles in the suspension medium thereby again producing a homogenous, free flowing composition.

One commercially available and effective polymeric coupling agent is a polyelectrolytic water-soluble sulfonated naphthalene formaldehyde condensate called Lomar D, marketed by Geo Specialty Chemicals as a 40% by weight of solids in a water solution. The average size of the molecule in LOMAR D is large (approximately 12,000 molecular weight units). Although the monomer (naphthalene sulfonate) is highly polar, extensive polymerization sterically prevents the polymer from acting or behaving as a conventional surface active agent. Consequently, it does not appreciably lower surface tension (a key property of a surfactant) nor does it have an obvious critical micelle concentration (another property of surfactants).

Other, non-limiting examples of suitable coupling agents include sulphonated or partially sulphonated naphthalene formaldehyde condensates, polymeric condensates of linear alkyl benzene sulphonic acids and naphthalene sulphonic acids with formaldehyde and mixtures thereof. When the polymeric coupling agent is employed, it will generally be present in an amount of from about 0.1 to about 4 wt. %, preferably from about 0.5 to about 3 wt. %.

Other polyelectrolytic water-soluble polymers, made from charged, highly polar monomers, exist and would be effective coupling agents for forming stable formulations of water, polyolefin, and surfactant. These include other condensation products made up of repeating units of alkyl, alkylaryl or alkylaromatic hydrocarbons that have been derivatized to increase water solubility, such as being sulfonated, sulfated, phosphate, and so forth (any condensation product where polymer length negates surface activity of the monomer, but provides coupling properties). Other classes of products include partially hydrolyzed polyacrylamide polymers such as Pushers and Separans (Dow Chemical Company), various biopolymers (e.g., such as Kelsans, available from Kelco Company), and ionic polysaccharides.

Especially desirable bridging systems consist essentially of (i) a highly branched surfactant having the formula:

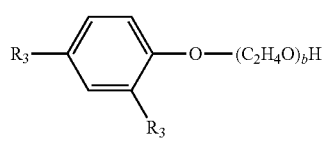

III wherein each $R_3$ is independently a branched $C_6$-$C_{18}$ alkyl group and b is the average number of ethoxy groups needed to achieve an overall HLB in the range of 6.5 to 8.5;

a (ii) a branched surfactant having the formula:

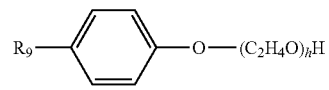

VII wherein $R_9$ is a branched $C_6$-$C_{18}$ alkyl group and h is the average number of ethoxy groups needed to achieve an overall HLB in the range of 6.5 to 8.5, in combination with a coupling agent selected from the group consisting of sulfonated naphthalene formaldehyde condensates, polymeric condensates of linear alkyl benzene sulfonic acids, condensates of naphthalene sulfonic acids with formaldehyde and mixtures thereof. Thus the surfactant of Formula III can be dinonyl phenol ethoxylate and the surfactant of Formula VII can be a nonyl phenol ethoxylate. The bridging systems (i) and (ii) identified above provide exceptionally stable, low foaming drag reducing compositions with high polyolefin drag reducer loading characteristics.

Drag reducing compositions that exhibit foaming are undesirable because the formulations are agitated during storage to maintain homogeneity, and foam generation can cause problems related to pumping the formulation for its intended use, can interfere with the agitation process itself, and can create product overflow from storage. To prevent these problems, an anti-foam agent can be added to the formulation, or the surfactant can be replaced by a low-foaming surfactant that produces less foam: both of which options add cost to the formulation.

The drag reducing compositions of the present invention, especially when using the bridging systems of (i) and (ii), do not require the use of anti-foam agents. The compositions are therefore easier to agitate by a variety of methods, e.g., high-speed blending, nitrogen-sparging, etc., as needed upon storage without any significant foaming. The compositions of the present invention are therefore easier and less expensive to prepare, due to fewer ingredients, and to store and handle, e.g. pump, due to a reduced concern related to foam generation. In addition, although alcohol(s) are sometimes added to drag reducing compositions to facilitate use under low-temperature conditions and to reduce foaming, their use is only required when low-temperature use is a factor.

The terms "carrier" or "suspending medium" mean a liquid, primarily aqueous in nature, in which the polymeric component is insoluble but which can contain water soluble compounds such as alcohols, glycols, etc.

In addition to the above components, the drag reducing composition of the present invention can also contain up to about 20 wt. % of an alcohol as a freeze point depressant. Suitable non-limiting examples of alcohols include alcohols and glycols containing from 1 to 14 carbon atoms, preferably from about 1 to about 8 carbon atoms. Specific, non-limiting examples of such alcohols and glycols include methanol, ethanol, propyl alcohols, butyl alcohols, hexyl alcohols, ethylene glycol, propylene glycol, triethylene glycol, glycerol, etc., as well as alcohols and glycols which contain ether linkages. It is desirable that the alcohols whether mono alcohols or polyhydric alcohols be miscible with the water as well as the surfactants employed. The use of an alcohol in the compositions is only necessary when the compositions may be used in low temperature environments where they can act as freeze point depressants so as to maintain the compositions fluid at such low temperature conditions. When employed, the alcohols will be present in an amount of from 0 up to about 20 wt. % of the composition.

The composition of the present invention can also include, with advantage, thickening agents, non-limiting examples of which include guar gum, guar gum derivatives, hydroxy methyl cellulose, xanthan gums, polyacrylamides, hydroxy propyl cellulose, modified starches, and polysaccharides. When employed, the thickening agents will generally be present in an amount of from about 0.01 to about 1.0 wt. %, preferably from about 0.25 to about 0.5 wt. %. A particularly desirable thickening agent is an anionic polysaccharide marketed under the name Welan Gum by C.P. Kelco.

The compositions of the present invention can also include, with advantage, a biocide in an amount of from about 0.01 to about 0.5 wt. %, preferably from about 0.05 to about 0.3 wt. %. Non-limiting examples of typical biocides include: glutaraldehyde, a glutaraldehyde/quaternary ammonium compound blend, isothiazolin, tetrakishydromethyl phosphonium sulfate (THPS), 2,2-dibromo-3-nitrilopropionamide, bronopol and mixtures thereof.

In one method of preparing the compositions of the present invention, the drag reducing polymeric agent is ground at cyrogenic temperatures to produce a finely divided free flowing particulate polyolefin material. The term "cyrogenic temperatures" means temperatures below the glass transition temperature of the polymer or copolymers which are being subjected to grinding. For example, when the polyolefin friction-reducing agent is a high molecular weight polymer (1-decene), the cyrogenic temperature is below about −60° C. The temperature employed in carrying out the grinding operation can vary depending on the glass transition point of the particular polymer or polymers used. However, such temperatures must be below the lowest glass transition point of the polymer. Any commercial grinders which are capable of producing finely subdivided particles from solids may be used in producing the free flowing, particulate polyolefin material. Examples of suitable grinders include impact mills, rod mills, ball mills, and the like. The particle size of the resulting particulate polyolefin material can be controlled by methods well known in the art such as by varying the grinding speed, controlling the time of grinding, employing a grinding aid, etc. Techniques for cyrogrinding drag reducing particulate polyolefins are disclosed in U.S. Pat. Nos. 4,837,249; 4,826,728; 4,789,383, all of which are incorporated herein by reference. Depending upon the storage, handling and transportation temperatures to which the friction reducing compositions of the present invention are subjected, it may not be necessary, as noted above, to include a coating agent. However, generally speaking a coating agent will be employed and in this regard the present invention contemplates that at least a part of the coating agent may be added as part of the cyrogrinding step. Alternatively, the polymer can be cyroground in the absence of any coating agent and the coating agent and cyroground polymer added separately to the aqueous suspending medium. Thus, for example, cyroground poly alpha olefin friction reducing agent could be added directly to the suspending medium together with wax or some other coating agent. Indeed, it has been found that a stable non-agglomerating composition can be achieved in this manner. However, in the usual case, the cyrogrinding of the poly alpha olefin will occur in the presence of at least a portion of the coating agent, the remainder of the coating agent, if needed, being added to the suspending medium together with the cyroground poly alpha olefin.

Other methods of grinding or forming particulate drag reducing polymer are disclosed in U.S. Pat. Nos. 6,894,088; 6,946,500; 7,271,205, and U.S. Publication 2006/0276566.

The compositions of the present invention can also include emulsifiers although typically emulsifiers are not necessary.

The stable, non-agglomerating compositions of the present invention flow easily and can be readily injected into a pipeline or conduit containing flowing hydrocarbons without any special equipment. Generally, the drag reducing compositions of the present invention can be added to the flowing hydrocarbon fluid by continuous injection by means of proportioning pumps situated at desired locations along the conduit in which the hydrocarbon is flowing.

The hydrocarbon fluids in which friction loss may be reduced by addition of the drag reducing compositions of the present invention include such materials as crude oils, gas oils, diesel oils, fuel oils, refined liquid hydrocarbon stream, asphaltic oils, and the like, varying from materials with relatively low viscosity, pure materials to high viscosity hydrocarbon containing fractions.

The amount of the polyolefin friction-reducing agent used for reducing drag in a pipeline or conduit is usually expressed as ppm (parts by weight of polymer per million parts by weight of hydrocarbon fluid). The amount of a polyolefin friction reducing agent required to produce the desired drag reduction will vary depending upon the physical properties and composition of the hydrocarbon fluid. Thus, the desired result may be obtained by the addition of as little as two ppm or less of the polymer. Conversely, some high viscosity fluids may require as much as 1,000 ppm or even up to 10,000 ppm of the polyolefin friction reducing agent to achieve desired drag reduction. Generally, it is preferred to add the polyolefin friction reducing agent in amounts of from about 2 to about 500 ppm and most preferably amounts from about 1 to about 100 ppm.

Non-limiting examples of drag reducing formulations according to the present invention are given in Table I below. Unless otherwise specified all percentages are by weight. All formulations in Table I were tested and exhibit excellent drag reduction properties and stability which was determined visually. All formulations were stable and found to be essentially low-foaming.

TABLE I

| | Water | Solids (82% polyolefin, 15% calcium stearate, 3% wax) | Surfactant | Polymeric Coupling agent | Thickening Agent | Biocide |
|---|---|---|---|---|---|---|
| Formulation 1 | 56.38% | 43.00% | 0.50% di-nonylphenol 5-mol ethoxylate (Harcros DNP-5.3)[1] | 0% | 0.10% Welan Gum | 0.02% Chemcide[2] G-50 |

TABLE I-continued

| | Water | Solids (82% polyolefin, 15% calcium stearate, 3% wax) | Surfactant | Polymeric Coupling agent | Thickening Agent | Biocide |
|---|---|---|---|---|---|---|
| Formulation 2 | 49.48% | 50.00% | 0.50% di-nonylphenol 5-mol ethoxylate (Harcros DNP-5.3) | 0% | 0% | 0.02% Chemcide G-50 |
| Formulation 3 | 52.88% | 43.00% | 2.00% octylphenol 3-mol ethoxylate (TRITON X-35)[3] | 2.00% naphthalene formaldehyde condensate (LOMAR D)[4] | 0.10% Welan Gum | 0.02% Chemcide G |
| Formulation 4 | 45.98% | 50.00% | 2.00% octylphenol 3-mol ethoxylate (TRITON X-35) | 2.00% naphthalene formaldehyde condensate (LOMAR D) | 0% | 0.02% Chemcide G |
| Formulation 5 | 60.88% | 38.00% | 1.00% octylphenol 3-mol ethoxylate (TRITON X-35) | 0% | 0.10% Welan Gum | 0.02% Chemcide G |

[1]Marketed by Harcros Chemicals, Inc.
[2]Marketed by Diversity Technologies Corp.
[3]Marketed by Dow Chemical Company
[4]Aqueous solution of 40% by weight of a sulfonated naphthalene formaldehyde condensate marketed by Geo Specialty Chemicals The drag reducing compositions of the present invention provide a number of advantages. A particular advantage of the drag reducing compositions of the present invention as mentioned above is the fact that they do not require the presence of an anti-foaming agent, thus reducing their cost. Indeed, it is a feature of the present invention that the drag reducing compositions of the present invention are substantially free of any anti-foaming agent. Additionally, since the drag reducing compositions of the present invention are essentially low-foaming, they can be easily shipped, pumped, and injected into pipe lines without undergoing deleterious foaming. Their low-foaming characteristics minimize handling procedures. Additionally, the compositions can easily be injected in the pipeline without any special equipment such as special nozzles or placement of nozzles. The polymer component (including the partitioning agent, e.g. polyolefin wax) of the compositions of the present invention readily dissolve in the flowing hydrocarbon.

The compositions of the present invention can be used with a high loading of the polyolefin friction reducing agent (e.g., polyolefin only) of up to about 45%, more particularly up to abut 41% by weight which is still a stable, free flowing composition. When described in terms of total solids, e.g. polyolefin, partitioning agent, etc., the loading can be up to about 50% by weight. It will be recognized that this high loading substantially reduces transportation costs as the shipping volume of the friction reducing composition is reduced. Further, since the suspending medium is basically water, environmental hazards both in transportation and in use of the composition are greatly reduced.

The foregoing description and examples illustrate selected embodiments of the present invention. In light thereof, variations and modifications will be suggested to one skilled in the art, all of which are in the spirit and purview of this invention.

What is claimed is:

1. An aqueous drag reducing composition comprising:
   from about 10 to about 45% by weight of a finely divided solid polyolefin, friction-reducing agent formed from mono-olefins containing from 2 to 30 carbon atoms and produced by solution polymerization or bulk polymerization;
   from about 0.1 to about 8% by weight of a surfactant having an HLB of from about 6.5 to about 8.5; and
   an aqueous suspending medium.

2. The composition of claim 1, wherein said aqueous suspending medium comprises water.

3. The composition of claim 1, wherein said drag reducing agent is present in an amount of from about 30 to about 41% by weight.

4. The composition of claim 1 further including from 0.1 to 25% by weight of a coating agent.

5. The composition of claim 4, wherein said coating agent comprises a wax.

6. The composition of claim 5, wherein said wax is a hydrocarbon wax.

7. The composition of claim 4, wherein said coating agent comprises a metallic salt of a fatty acid.

8. The composition of claim 1, further comprising:
   a freeze point depressant in an amount of up to about 20% by weight of the composition.

9. The composition of claim 8, wherein said freeze point depressant is selected from the group consisting of alcohols and glycols containing from 1 to 14 carbon atoms.

10. The composition of claim 1 further including an effective amount of a biocide.

11. The composition of claim 1, wherein surfactant comprises a highly branched surfactant having the general formula:

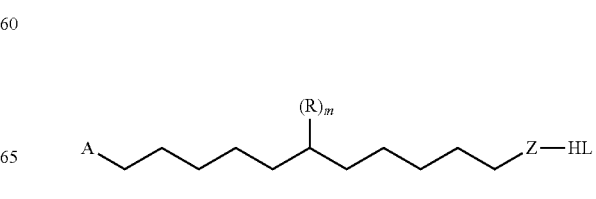

I wherein

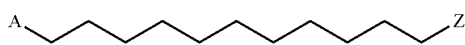

is the hydrophobic portion and represents a hydrocarbon parent chain having from 6 to 40 carbon atoms;
wherein m represents the number of R groups and is from 2 to 20;
wherein each of the R groups is attached to a carbon atom in the hydrocarbon parent chain;
wherein each of the R groups is independently a $C_1$-$C_{18}$ alkyl group with the proviso that at least two of the R groups attached to the hydrocarbon parent chain are branched alkyl groups containing from 3 to 18 carbon atoms;
wherein HL represents the hydrophilic portion with the proviso that HL can be attached to any carbon atom in the hydrophobic portion; and
wherein the hydrocarbon parent chain and any one or more of the R groups can be connected in such a way as to form one or more cyclic groups.

12. The composition of claim 11, wherein said hydrophilic portion (HL) is an alkoxylate grouping.

13. The composition of claim 12, wherein said alkoxylate grouping is an alkoxylate grouping having at least two ethoxy groups.

14. The composition of claim 11, wherein the highly branched surfactant is selected from the group consisting of:
a 2-pentyl-4-butyl hexanol alkoxylate having the formula:

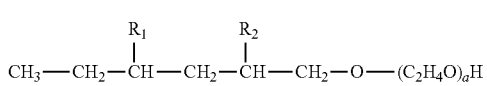

II wherein $R_1$ is a branched $C_4$ alkyl group, $R_2$ is a branched $C_5$ alkyl group, and a is the average number of ethylene oxide groups necessary to achieve an HLB range of from 6.5 to 8.5;
a dinonylphenol alkoxylate having the formula:

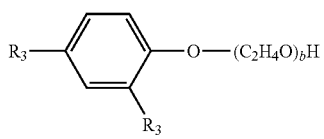

III wherein each $R_3$ is independently a branched $C_6$-$C_{18}$ alkyl group and b is the average number ethoxy groups required to achieve an HLB in the range of 6.5 to 8.5;
a triglyceride alkoxylate having the formula:

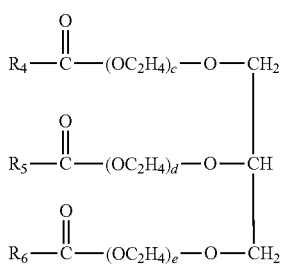

IV wherein $R_4$, $R_5$ and $R_6$ are independently $C_6$-$C_{18}$ alkyl groups and c, d and e are equal to the average number of ethoxy groups required to reach an overall HLB of from 6.5 to 8.5, and mixtures thereof.

15. The composition of claim 1, wherein said surfactant is selected from the group consisting of:
a linear alcohol ethoxylate having the formula:

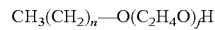

V wherein n is 5 to 27, and f is the average number of ethoxy groups required to achieve an overall HLB of from 6.5 to 8.5,
a secondary alcohol ethoxylate having the formula:

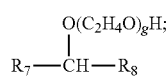

VI wherein each $R_7$ and $R_8$ are independently alkyl groups having from 0 to 23 carbon atoms, e and t are each from 0 to 23 and f is the average number of ethoxy groups required to achieve an overall HLB of from 6.5 to 8.5,
and a nonylphenol alkoxylate having the formula:

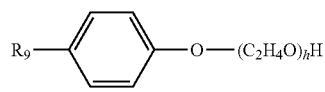

VII wherein $R_g$ is a branched $C_6$-$C_{18}$ alkyl group and h is the average number of ethoxy groups required to achieve an overall HLB in the range of 6.5 to 8.5, and mixtures thereof.

16. The composition of claim 15, comprising a polymeric coupling agent having negligible surface activity.

17. The composition of claim 16, wherein said coupling agent is selected from the group consisting of partially sulfonated naphthalene formaldehyde condensates, polymeric condensates of linear alkyl benzene sulfonic acids, and naphthalene sulfonic acids with formaldehyde and mixtures thereof.

18. The composition of claim 17, wherein said coupling agent is present in an amount of from about 0.1 to about 4% by weight.

19. The composition of claim 1, wherein said surfactant consists essentially of:
(i) a highly branched surfactant having the formula:

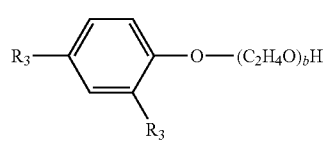

III wherein each $R_3$ is independently a branched $C_6$-$C_{18}$ alkyl group and b is the average number of ethoxy groups required to achieve an overall HLB in the range of 6.5 to 8.5;

a (ii) a branched surfactant having the formula:

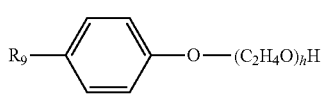
VII wherein $R_9$ is a branched $C_6$-$C_{18}$ alkyl group and h is the average number of ethoxy groups required to achieve an overall HLB in the range of 6.5 to 8.5, in combination with a coupling agent selected from the group consisting of sulfonated naphthalene formaldehyde condensates, polymeric condensates of linear alkyl benzene sulfonic acids, and condensates of naphthalene sulfonic acids with formaldehyde and, mixtures of (i) and (ii).

20. A method of reducing drag in a flowing hydrocarbon stream comprising:
introducing into said stream an effective amount of the drag reducing composition of claim 1.

21. An aqueous drag reducing composition comprising:
from about 10 to about 45% by weight of a finely divided solid polyolefin, friction-reducing agent formed from mono-olefins containing from 2 to 30 carbon atoms;
from about 0.1 to about 8% by weight of a surfactant having an HLB of from about 6.5 to about 8.5, said surfactant being selected from the group consisting of:
a linear alcohol ethoxylate having the formula:

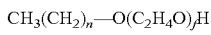
V wherein n is 5 to 27, and f is the average number of ethoxy groups required to achieve an overall HLB of from 6.5 to 8.5, a secondary alcohol ethoxylate having the formula:

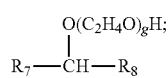
VI wherein each $R_7$ and $R_8$ are independently alkyl groups having from 0 to 23 carbon atoms, e and t are each from 0 to 23 and f is the average number of ethoxy groups required to achieve an overall HLB of from 6.5 to 8.5,
and a nonylphenol alkoxylate having the formula:

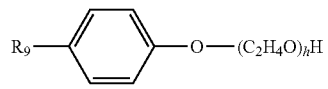
VII wherein $R_g$ is a branched $C_6$-$C_{18}$ alkyl group and h is the average number of ethoxy groups required to achieve an overall HLB in the range of 6.5 to 8.5, and mixtures thereof;
a polymeric coupling agent having neglible surface activity, said coupling agent being selected from the group consisting of partially sulfonated naphthalene formaldehyde condensates, polymeric condensates of linear alkyl benzene sulfonic acids, and naphthalene sulfonic acids with formaldehyde and mixtures thereof; and
an aqueous suspending medium.

22. The composition of claim 21, wherein said coupling agent is present in an amount of from about 0.1 to about 4% by weight.

* * * * *

UNITED STATES PATENT AND TRADEMARK OFFICE
CERTIFICATE OF CORRECTION

PATENT NO.        : 8,669,304 B2
APPLICATION NO.   : 12/996055
DATED             : March 11, 2014
INVENTOR(S)       : Brad A. Bucher et al.

Page 1 of 1

It is certified that error appears in the above-identified patent and that said Letters Patent is hereby corrected as shown below:

In the Claims:

At column 14, claim 15, line 35, please change "Wherein Rg is a" to --Wherein R9 is a--

At column 16, claim 21, line 22, please change "Wherein Rg is a" to --Wherein R9 is a--

Signed and Sealed this
Twentieth Day of May, 2014

Michelle K. Lee
*Deputy Director of the United States Patent and Trademark Office*